US008931072B2

(12) United States Patent
Magnusson

(10) Patent No.: US 8,931,072 B2
(45) Date of Patent: Jan. 6, 2015

(54) METHOD OF GAINING ACCESS TO A DEVICE

(76) Inventor: Niklas Magnusson, Taby (SE)

(*) Notice: Subject to any disclaimer, the term of this patent is extended or adjusted under 35 U.S.C. 154(b) by 1684 days.

(21) Appl. No.: 12/048,896

(22) Filed: Mar. 14, 2008

(65) Prior Publication Data

US 2008/0162676 A1 Jul. 3, 2008

Related U.S. Application Data

(63) Continuation-in-part of application No. 12/066,842, filed as application No. PCT/US2006/037706 on Sep. 28, 2006.

(51) Int. Cl.
*G06F 7/04* (2006.01)
*G07C 9/00* (2006.01)

(52) U.S. Cl.
CPC ........ *G07C 9/00309* (2013.01); *G07C 9/00103* (2013.01); *G07C 9/00904* (2013.01); *G07C 2009/00468* (2013.01); *G07C 2209/08* (2013.01)
USPC .............................................................. 726/9

(58) Field of Classification Search
CPC ... H04L 9/085; H04L 9/3263; H04L 63/0428; G06F 21/602
See application file for complete search history.

(56) References Cited

U.S. PATENT DOCUMENTS

| | | | | | |
|---|---|---|---|---|---|
| 4,386,266 | A * | 5/1983 | Chesarek | | 705/72 |
| 4,733,345 | A * | 3/1988 | Anderson | | 713/155 |
| 5,832,210 | A * | 11/1998 | Akiyama et al. | | 713/168 |
| 6,185,307 | B1 * | 2/2001 | Johnson, Jr. | | 380/270 |
| 2003/0046534 | A1 * | 3/2003 | Alldredge | | 713/153 |
| 2003/0163701 | A1 | 8/2003 | Ochi et al. | | |

FOREIGN PATENT DOCUMENTS

JP 2002117448 4/2002

* cited by examiner

*Primary Examiner* — Tamara T Kyle
(74) *Attorney, Agent, or Firm* — Fasth Law Offices; Rolf Fasth

(57) ABSTRACT

The method is for activating a device. A communication device is provided that is in communication with a server unit that has a processor for generating a number series. An application device has a processor for generating a number series. The communication device is not communicating directly with the application device. The user sends a message including the identification number to the server. The server identifies a code number pointed at by a pointer and sends back the code number. The pointer steps forward in the number series at predetermined time intervals. The user enters the code number into the application device. The processor compares the code number with a number pointed at by a pointer and sends an activation signal to an activation device to activate the application device.

10 Claims, 4 Drawing Sheets

METHOD OF GAINING ACCESS TO A DEVICE

PRIOR APPLICATIONS

This is a continuation-in-part application of U.S. patent application Ser. No. 12/066,842, filed 14 Mar. 2008.

TECHNICAL FIELD

The present invention relates to a method of gaining access to a device such as unlocking a bathroom door or buying goods disposed inside a locked vending machine by activating the vending machine to dispense goods disposed therein.

BACKGROUND OF INVENTION

Publicly available services such as, hotel room, rental cottages, public bathrooms and vending machines often require the user to pay to gain access such as unlocking the door or dispensing a food item inside the locked vending machine. Users many times do not have the correct or enough change to gain such access. This can be very inconvenient especially for distressed users. There is a need for a more effective way for the users to gain access to such services and places.

SUMMARY OF INVENTION

The method of the present invention provides a solution to the above-outlined problems. More particularly, the method is for activating a device. A communication device is provided that is in communication with a server unit that has a processor for generating a number series. An application device has a processor for generating a number series. The communication device is not communicating directly with the application device. The user reads an identification number and sends a message including the identification number or, for example, a room or house number to the server. The user may also include information related to an amount to be spent and/or rental period. The server identifies a code number pointed at by a pointer and sends back the code number. The server may encrypt the additional information provided into the code number. The pointer steps forward in the number series at predetermined time intervals. The user enters the code number into the application device. For example, a keyboard may be used to enter the code number. The processor compares the code number with a number pointed at by a pointer and sends an activation signal to an activation device to activate the application device.

DETAILED DESCRIPTION

Figure 1:
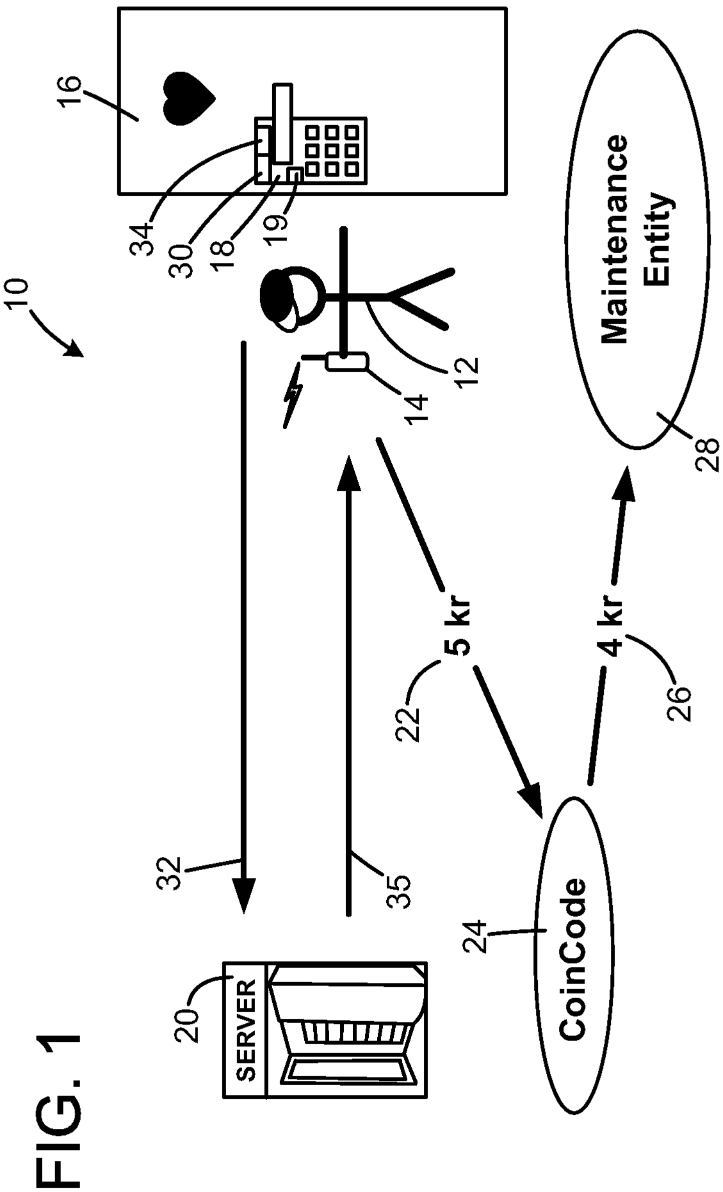
FIG. 1 is a schematic view of the components of the system of the present invention.

With reference to FIG. 1, the system 10 has a user 12 with a communication device 14 such as a mobile telephone. The user may desire to gain access to a service or device 16 such as unlocking a locked bathroom or hotel room door that has a lock 18 with a microprocessor 19 and an identification number 55. It should be noted that the lock 18 is only used for illustrative purposes and that the method of the present invention may be used for a variety of applications such as activating and de-activating a vending machine, an electrical device, a shower, gambling device or any other suitable application.

The communication device 14 is in communication with a server 20 and the user is preferably charged a fee 22 by a service operator 24 that in turn may send a compensation fee 26 to, for example, a subscriber and/or maintenance entity 28 or any other type of owner or user. The maintenance entity 28 may maintain the device 16. It may also be possible to make the compensation fee 26 identical with the fee 22 and that the service operator 24 charges a leasing fee for the lock 18 to the maintenance entity 28. Preferably, every lock has a unique identification code.

More particularly, the user may start by reading an identification number or code 30 on the lock 18 and then, for example, send an SMS message 32 or any other suitable message to a number 34 displayed on the lock 18 or device 16. The server 20 receives the message 32 including the code 30 and returns an unlocking code 35 for the lock 18. The user enters the code 35 into the lock 18 that unlocks the door or device 16 so that the user 12 may gain access thereto.

Figure 2:
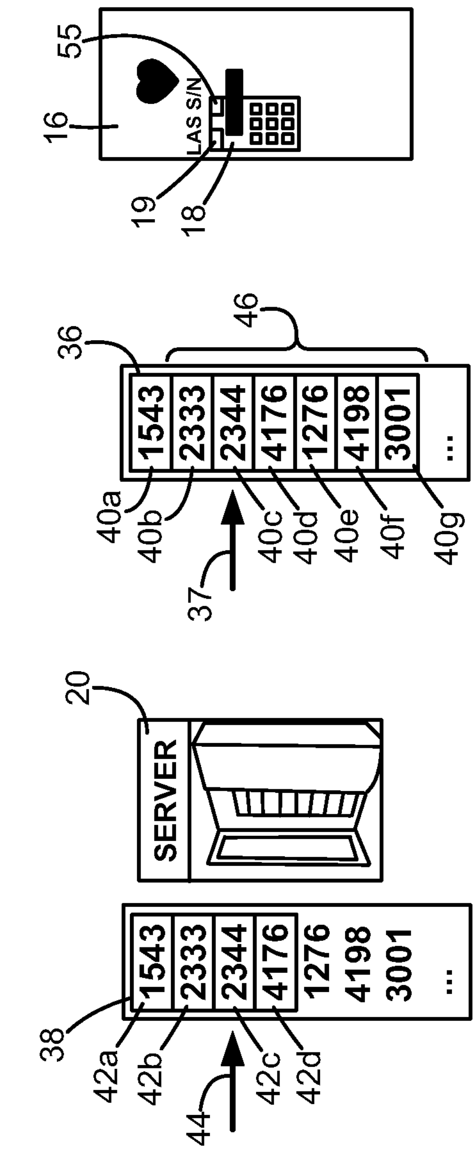
FIG. 2 is a schematic view showing number series for decoding a locking device of the system of the present invention.

One important feature of the present invention is that the required unlocking code 35 changes with each user so that the users cannot use the same code to unlock the lock each time. As best shown in FIG. 2, the system 10 may have a first endless number series 36 at the microprocessor 19 that has a pointer 37 and a second endless number series 38 at the server 20 that has a pointer 44. One feature is that the various codes 40*a*, 40*b*, 40*c*, 40*d* of the series 36 preferably match codes 42*a*, 42*b*, 42*c*, 42*d*, respectively. In this way, the series 36 is preferably identical to the series 38. The pointers 37, 44 point to the code that is currently being used. Preferably, the pointers should point to the same codes so that pointer 37 points to code 40*b* when the pointer 44 points code 42*b* which is identical to code 40*b*. After each use the pointers move one step forward such as from code 40*b* to 40*c* and from code 42*b* to 42*c* at the same time.

The user 12 does not know which code opens the lock 18 at a particular time so that the user needs the code from the server 20. The pointer 37 may be set to point to the code, such as code 40*c*, that currently opens the lock. The server sends code 42*c* which is identical to the code 40*c* and the user can enter the code 42*c* to open the lock 18.

There may be situations when the pointer 44 is not synchronized with the pointer 37. For example, the user 12 may receive the code 42*c* but never opens the lock 18 which triggers the pointer 37 to move from the code 40*c* to code 40*d*. The pointer 37 therefore stays at pointing to code 40*c* while the pointer 44 has moved to point to code 42*d*. Next time a user wants to unlock the door, the server 20 will send code 42*d* which does not match code 40*c* of the series 36. Consequently, the user cannot open the lock. This problem may be solved by providing a set of codes, as indicated by a bracket 46 that are acceptable to unlock the lock 18. For example, the bracket 46 may include the codes 40*b*, 40*c*, 40*d*, 40*e*, 40*f* and 40*g* so that up to six users in a row may obtain the codes from the server 20 without using the device 16. Of course, the acceptable interval symbolized by the bracket 46 may include more codes or fewer codes. When the server 20 now sends the code 42*d* the user may enter the code 42*d* since the corresponding identical code 40*d* is within the set of the bracket 46.

After each time the device 16 is used, the bracket 46 may move forward one step in the series 36 similar to the stepping forward by the pointer 37. Also, the microprocessor 19 may move the pointer 37 to the code, such as code 40*c*, so that the pointer 37 is again automatically synchronized with the pointer 44 each time the device 16 is used. Preferably, the pointer 37 points to a code that is in the middle of the bracket 46 so that the position of the bracket 46 is adjusted accordingly.

It should be noted that there is no need to display any of the codes. Another important feature is that there is no electronic, radio, optical or any other type of remote wired/wireless or automatic communication between the communication device 14 and the lock 18. The user must enter the code 42 received from the server 20 manually into the lock 18 in order to unlock the lock.

Instead of using a number series it is possible to use the same random algorithm at the lock and the server so that the lock may generate a random code that is disclosed to the user. This random code is then sent to the server that in turn runs the same random algorithm to generate a second code. This second code is sent back to user's telephone. In the meantime, the lock has run the algorithm to generate the second code also. The user enters the second code into the lock that is matching the second code generated by the lock. As a result, the lock unlocks itself or provides the user access to the device.

Figure 3:
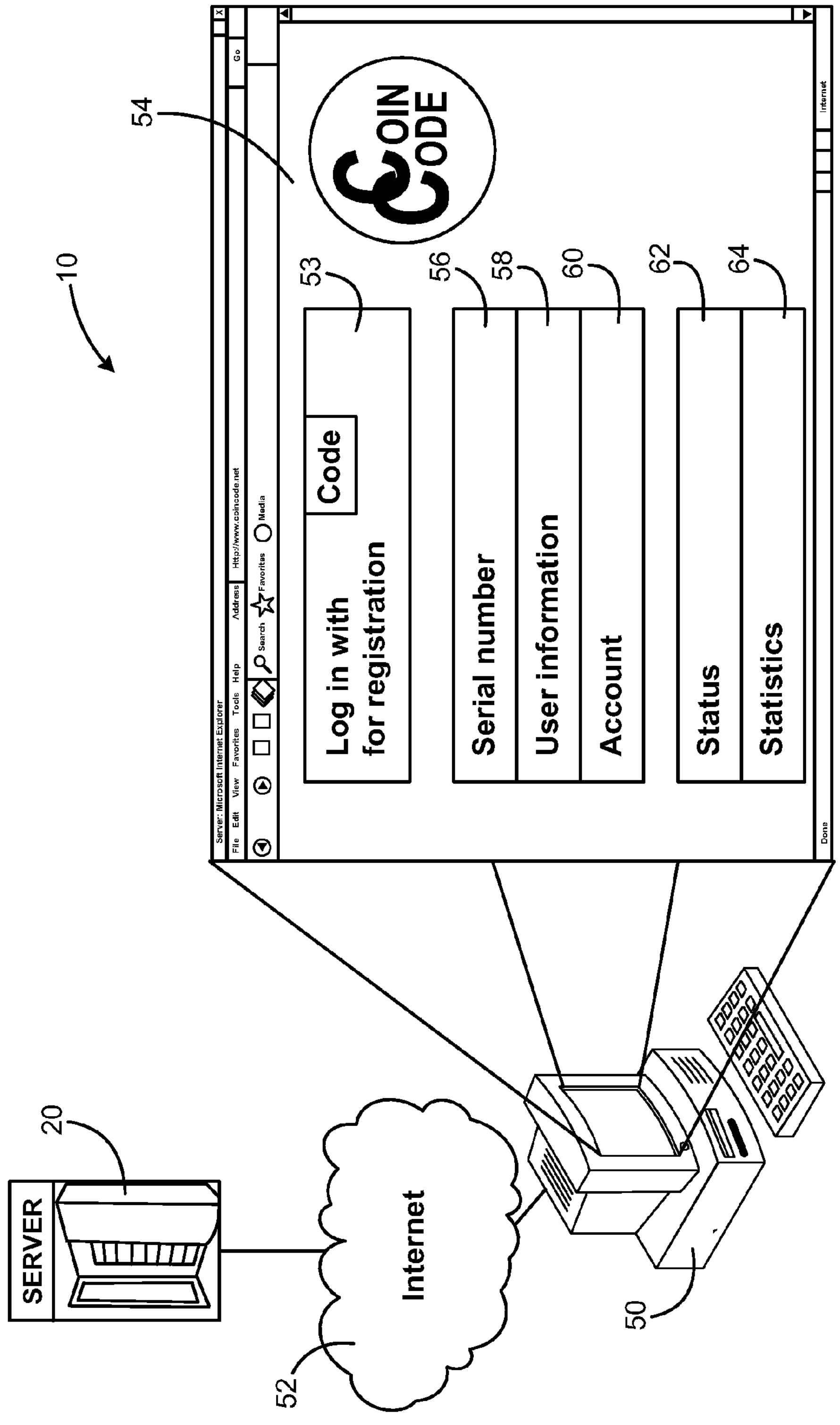
FIG. 3 is a schematic view of a subscription procedure to activate the system of the present invention.

FIG. 3 is a schematic view of an alternative embodiment of the system 10. A user, such as a restaurant or other suitable users, may register with a computer 50 for the service by entering the Internet 52 to contact a website 54 of the service provider. The user may log in for registration 53 at a website 54. The user may enter a code or serial number 56 that is printed on the locks to gain access to serial numbers of the locks 18, user information 58 and accounts 60 to receive payments from the various locks. Of course, the code sent could be any suitable number. The user may also gain access to status information 62 and statistical information 64. The statistical information may show which product or toilet that is mostly or the least used. If, for example, a vending machine has run out of a product, the lock may be programmed to send a code back to the service provider that indicates that there is time to refill or recharge batteries. The service provider may offer the service of refilling or taking care of whatever needs to be done. This may be sent by email or any other suitable communication device. An important feature is that the registration process is self-administered and that no personal contact with the service provider is necessary.

It may also be possible to require the user to include an amount to be spent in the SMS request. For example, a dollar amount to be spent on goods in a vending machine so that the user not only sends the identification code of the vending machine but also a dollar amount to be spent. The dollar amount may then be encrypted into unlocking code that is eventually sent to the buyer so that the code becomes dynamic. The terminal may then decrypt the unlocking code that is received so that the vending machine knows that the credit amount is the dollar amount requested by the buyer and can then compare that the code is correct, as described above. Preferably, the buyer cannot buy one or many goods for a value that is higher than the dollar amount.

It may also be possible for the pointers 37 and 44 to move forward at certain time intervals such as every minute or every hour. This is particularly suitable when the user wants to gain access to, for example, a hotel room or rental cottage during a certain rental period. The unlocking code that is provided to the user may be valid only during the entire rental period such as from a certain time of the day and then for a certain time period such as five days.

When the unlocking code is very long, the lock may give the user the option to enter not only the entire unlocking code once but also a short code that, for example, must be entered within ten seconds. The unlocking code could also be associated with another code carrier such as a RFID card or magnetic card. The short code could also be valid during the rental period so that the user can unlock the door by simply entering the short code. The system will then associate the short code with the full code so that the short code may be translated to the full code. The short code may be a personal password or, for example, be the last four digits of the full code. It may also be possible for each family member to have a different personalized password that is valid during the time period.

The time period, that is provided to the server in addition to the identification of the rental cottage, may be encrypted into the code sent by the user's mobile telephone so that when the door lock receives the code from the server it first decrypts the time period and can then look back in the series of codes to see what the correct code was at the start of the time period. As indicated above, the time period may also be used to determine the length of the time period during which the same code may be used to unlock the door lock.

Figure 4:
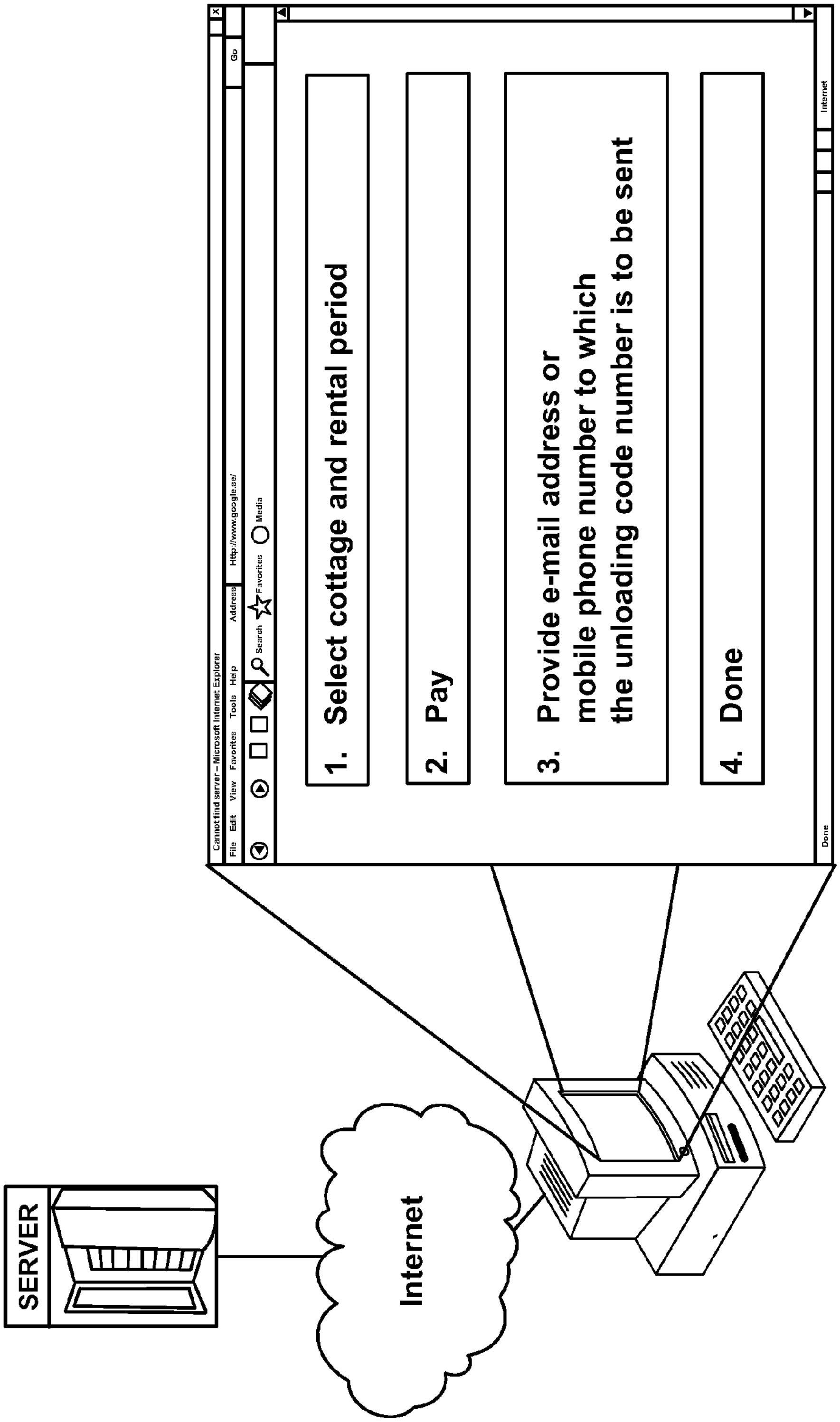
FIG. 4 is a schematic view of an alternative embodiment of the system of the present invention.

With reference to FIG. 4, a system 100 is shown wherein the pointers step forward in the number series at certain intervals. More particularly, the system 100 has a computer 150 that is connected to a server 120 via the Internet 152. A display 154 illustrates a selection step 151 that includes selecting an object 153, such as an un-manned rental service of rooms and cottages, and a rental period 155. In a payment step 157, the user may pay the service provider such as by using a credit card. In an addressing step 159, the user provides an electronic address 161 or a telephone number 163 to which a code 165 is sent so that the user can unlock a door of the object/cottage. The code 165 may be set to be valid during the rental period only so that the door cannot be opened before or after the rental period with the code 165 by using the unlocking code 165.

While the present invention has been described in accordance with preferred compositions and embodiments, it is to be understood that certain substitutions and alterations may be made thereto without departing from the spirit and scope of the following claims.

The invention claimed is:

1. A method of activating a device, comprising:

providing a communication device in communication with a server unit that has a processor for generating a first number series and providing an application device that has a processor for generating a second number series;

the user reading an identification number and sending a request message including the identification number to the server;

a pointer of first number series stepping forward to point at a first subsequent code number after a predetermined time period;

a pointer of the second number series stepping forward from pointing at a second code number to point at a second subsequent code number after a predetermined time period;

upon receipt of the identification number, the server generating a code number pointed at by a pointer;

the server sending the first subsequent code number back to the communication device, the communication device not being in communication with the application device, the server not being in communication with the application device;

the user manually entering the first subsequent code number into the application device;

the processor comparing the first subsequent code number with the second subsequent code number pointed at by the pointer of the number series;

the processor sending an activation signal to an activation device to activate the application device when the first subsequent code number is identical to the second subsequent code number, and the processor identifying a number range of acceptable numbers that triggers the processor to send the activation signal to the activation device even if the code number does not match a code number pointed at by the pointer as long as the number pointed at is in the number range.

2. The method according to claim 1 wherein the method further comprises the user including a second number separate from the identification number in the request message.

3. The method according to claim 2 wherein the method further comprises the user includes an amount in the request message to indicate a maximum amount to be purchased.

4. The method according to claim 3 wherein the method further comprises the server encrypting the amount into the code prior to sending back the code to the user.

5. The method according to claim 1 wherein the method further comprises the user submitting a rental period together in the request message.

6. The method according to claim 5 wherein the method further comprises the making the first subsequent code number valid only during a rental period.

7. The method according to claim 1 wherein the method further comprises the user entering a short code subsequent to the first subsequent code number.

8. The method according to claim 7 wherein the method further comprises the application device associating the short number with the first subsequent code number so that both the short number and the first subsequent code number are valid.

9. The method according to claim 8 wherein the method further comprises the short number being valid only during a limited time period determined by a user of the communication device.

10. The method according to claim 9 wherein the method further comprises the application device decrypting a rental period from the first subsequent code number to determine a validity time period of the short number.

* * * * *